United States Patent [19]
Sato et al.

[11] Patent Number: 5,404,925
[45] Date of Patent: Apr. 11, 1995

[54] HEAVY DUTY PNEUMATIC RADIAL TIRES WITH A BELT COMPRISING FOUR STEEL CORD BELT PLIES

[75] Inventors: Tetsuhiko Sato; Hidetoshi Yoda, both of Tokyo, Japan

[73] Assignee: Bridgestone Corporation, Tokyo, Japan

[21] Appl. No.: 136,110

[22] Filed: Oct. 14, 1993

[30] Foreign Application Priority Data

Oct. 14, 1992 [JP] Japan .................. 4-301794

[51] Int. Cl.⁶ ..................... B60C 9/18; B60C 9/20
[52] U.S. Cl. ..................... 152/534; 152/526; 152/531
[58] Field of Search ......... 152/526, 538, 531, 533–535

[56] References Cited

U.S. PATENT DOCUMENTS

| | | | |
|---|---|---|---|
| 4,269,646 | 5/1981 | Miller et al. | 152/338 X |
| 4,274,464 | 6/1981 | Pommier | 152/538 X |
| 5,027,877 | 7/1991 | Tamura et al. | |
| 5,082,042 | 1/1992 | Kobayashi et al. | 152/538 X |
| 5,111,864 | 5/1992 | Nakano et al. | |

FOREIGN PATENT DOCUMENTS

| | | |
|---|---|---|
| 0318128 | 5/1989 | European Pat. Off. |
| 2244635 | 4/1975 | France. |
| 2386425 | 11/1978 | France. |

*Primary Examiner*—Adrienne Johnstone
*Attorney, Agent, or Firm*—Sughrue, Mion, Zinn, Macpeak & Seas

[57] ABSTRACT

A heavy duty pneumatic radial tire comprising a carcass, a tread and a belt layer consisting of four belt plies piled radially one above another and containing steel cords therein. The four belt plies consist of a large belt ply having a width wider than that of the other belt plies, a middle belt ply arranged radially inward of the large belt ply and having steel cords oblique in the same directions as those of steel cords of the large belt ply, a first small belt ply arranged between the large belt ply and the middle belt ply and having steel cords oblique in opposite directions to those of the cords of the large belt ply and a width smaller than that of the middle ply, a second small belt ply arranged radially inward of the middle belt ply and having steel cords oblique in opposite directions to those of the cords of the large belt ply and a width smaller than that of the middle belt ply.

5 Claims, 7 Drawing Sheets

COMPARISON

COMPARISON

COMPARISON

COMPARISON

COMPARISON

HEAVY DUTY PNEUMATIC RADIAL TIRES WITH A BELT COMPRISING FOUR STEEL CORD BELT PLIES

BACKGROUND OF THE INVENTION

1. Field of the Invention

This invention relates to heavy duty pneumatic radial tires which are applicable to heavy duty vehicles such as large construction vehicles.

2. Related Art Statement

In general, a heavy duty pneumatic radial tire 10 shown in FIG. 11 is adopted for large construction vehicles such as dumps, loaders, scrapers, and the like. The tire includes a carcass layer 11 reinforced by radially extending steel cords, a belt layer 16 arranged radially outward of the carcass layer 11 comprising four or more belt plies (four belt plies 12,13,14,15 in FIG. 1), and a tread 17 arranged radially outward of the belt layer 16. Oblique directions of the steel cords of each ply adjacent to each other are opposite and intersect.

However, when such a tire 10 is subjected to a heavy load during running, separations occur at both widthwise ends of belt plies 12,13,14,15.

In heavy duty pneumatic radial tires of this kind, deformations of the tread 17 force the inclined angles of the steel cords to deform in opposite directions in a so-called "Pantograph displacement". Also shearing strains occur because of the deformation of the steel cords in the rubber embraced between adjacent belt plies 12,13,14,15. The shearing strains progressively increase as displaced portions are nearer to ends of the belt plies in their width directions and have a maximum value at both ends of the belt ply 13.

In order to decrease the separations, therefore, an attempt has been made to restrain the shearing strains by changing the intersection angles of the steel cords of the belt plies with an equatorial plane E of the tires within limits which maintain performance of the tires, narrowing widths of the belt plies in their width directions within limits which maintain performance of the tires and arranging cushion rubbers at both of adjacent belt plies.

Although fairly good results have been obtained with such tires, separations could not be sufficiently prevented.

SUMMARY OF THE INVENTION

The inventors have investigated the cause of the separations at both ends of the belt plies. As a result, the following facts have been found besides the facts mentioned above. The shearing strains occur largely in an area 18 of the rubber embraced between a belt ply having maximum width (belt ply 14) and a belt ply having a second width (belt ply 13 arranged radially inward and adjacent to the belt ply 14). This increases rigidity of the rubber of the area 18 and makes it impossible to deform. During running of the tire, though a heavy load is applied to the tread (rubber) 17 between the belt ply having the maximum width 14 and a tread surface, and the rubber embraced between two plies does not easily deform because of its high rigidity. The tread 17, therefore, is pressed and deformed in a radial direction. At this time, rubber (the tread 17) is, in general, non-compressible, so the rubber whose volume is equal to that of the rubber pressed in the tread 17 flows to the ends of the plies in the width directions. The rubber flows to both widthwise ends of the belt ply 14 having the maximum width in width directions through the tread 17 and the belt ply 14 having the maximum width outside of the area 18 in width directions. In this flow, a distance L from the end of the belt ply 14 having the maximum width to that of the belt ply 13 having second width in width directions is so small that the rubber flow is accumulated at both ends of the belt ply 14 having the maximum width. As a result, tensile forces repeatedly occur at both ends of the belt ply 14 having the maximum width in the width directions. The tensile forces generate cracks finally resulting in separations.

It is a primary object of the invention to provide an improved heavy duty pneumatic radial tire which will effectively prevent separations at the widthwise ends of the belt plies.

In order to achieve this object, there is provided a heavy duty pneumatic radial tire comprising a carcass layer containing steel cords therein extending in a radial direction of the tire, a belt layer comprising four belt plies piled radially one another containing steel cords therein, a tread arranged radially outward of the belt layer. The four belt plies include a large belt ply having a width wider than that of the other belt plies, a middle belt ply arranged radially inward of the large belt ply having steel cords which are oblique in the same directions as those of steel cords of the large belt ply, a first small belt ply arranged between the large belt ply and the middle belt ply having steel cords which are oblique in directions opposite to those of the cords of the large belt ply and a width smaller than that of the middle ply, and a second small belt ply arranged radially inward of the middle belt ply having steel cords which are oblique in directions opposite to as those of the cords of the large belt ply and a width smaller than that of the middle belt ply.

When the heavy duty pneumatic radial tire is running, inclined angles of the steel cords of a large belt ply having the maximum width and that of a belt ply adjacent to the large belt ply having the maximum width (directions of steel cords are opposite to those of the large belt ply having the maximum width) deform in opposite directions from each other (Pantograph displacement). This deformations generates shearing strains in the rubber embraced between the large belt ply having the maximum width and the belt ply adjacent thereto. A value of the shearing strains progressively increases as displaced portions move further from an equatorial plane of the tire and have a maximum value at both ends of the belt ply. In the invention, however, a first small belt ply, having a width smaller than that of the large belt ply having the maximum width and a middle belt ply is arranged adjacent to the large belt ply having the maximum width. This is done instead of arranging the middle belt ply having a second width as a ply adjacent to the large belt ply having the maximum width. The value of the shearing strains, therefore, decreases by shortening the overlapping length of two belt plies in the width directions. In this case, moreover, because the middle belt ply has steel cords oblique in the same direction as those of the large belt ply having the maximum width, shearing strains hardly occur in the rubber embraced between the large belt ply having the maximum width and the middle belt ply having second width. As a result, separations never occur at both ends of the middle belt ply having the second width.

As previously mentioned, difficulty of the deformations of its rubber because of increased rigidity by the shearing strains results in flowing of the rubber whose volume is equal to that of the rubber pressed in the tread to the ends of the plies in the width directions. The rubber flows through the large belt ply having the maximum width outside of the ends of the first small belt ply in the width directions and the tread and generate tensile forces at both ends of the large belt ply having the maximum width in the width direction. When the rubber flows to both ends of the large belt ply, it affects the large belt ply and extends both ends of the large belt ply outward in the width direction. In this case, the first small belt ply having a smaller width than that of the middle belt ply provides a large length L from the first small belt ply to the large belt ply in the width direction. As a result, value of the tensile forces generated at both ends of the large belt ply is decreased. The decrease of the value of the tensile forces efficiently prevent the generation of cracks and also belt end separation. Further, a part of the large belt ply radially overlapped with the first small belt ply is restrained so strongly by the rubber embraced between two plies having high rigidity that it can hardly extend in the width directions. Also, since the large belt ply having the maximum width is arranged radially outermost, it is not necessary to consider the rubber flow of the tread adjacent to the middle belt ply, the first small belt ply and the second small belt ply all of which are arranged radially inward of the large belt ply.

One or more additional belt plies may be added in order to strengthen the so-called "hoop effect". In this case, these additional belt plies may be arranged wherever it is radially outward of the large belt ply 38, radially inward of the second small belt ply 35, and between two plies adjacent each other. Widths of the additional belt plies should be smaller than that of the belt ply having the smallest width among four belt plies in order to prevent belt end separation.

For a better understanding of the invention, reference is made to the attached drawings, wherein.

DETAILED DESCRIPTION OF THE INVENTION

Figure 1:
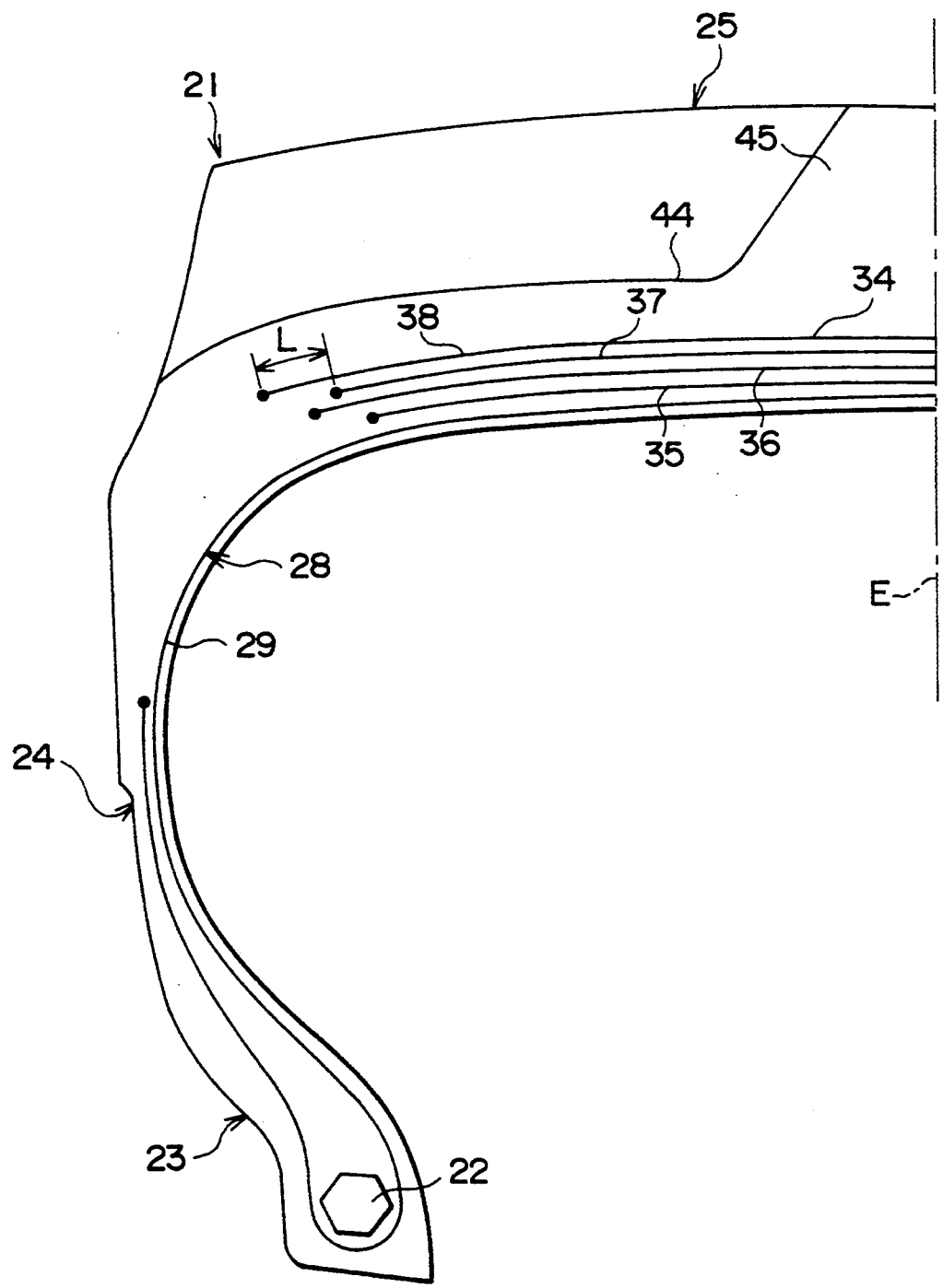
FIG. 1 is a sectional view of a tire of a first embodiment of the invention, taken along an equatorial plane of the tire.
Figure 2:
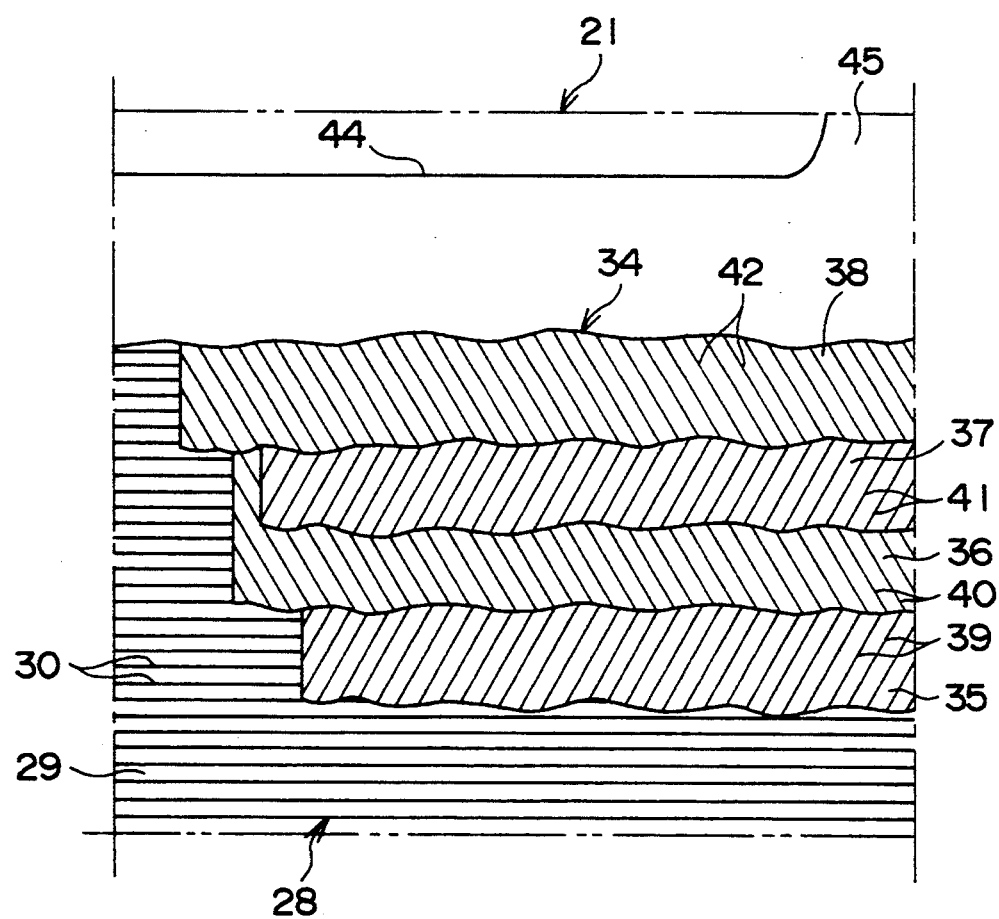
FIG. 2 is a sectional plan view of the tread.

The first embodiment of this invention will be explained by reference to the drawings. Referring to FIGS. 1 and 2, tire 21 is a heavy duty pneumatic radial tire to be used for dumps, loaders, scrapers etc. The tire 21 comprises a bead portion 23 having a pair of beads 22 therein, a pair of sidewall portions 24 extending radially outwardly from the bead portion 23, a tread portion 25 cylindrically constructed connecting each radial ends of the sidewall portion and a carcass layer 28 toroidally constructed and having radially extending cords anchored by the pair of the beads 22. Both ends of the carcass layer 28 in the width direction are turned up from axially inward to outward around the pair of the beads 22 on the right and left of the tire. The carcass layer 28 comprises at least one carcass ply (one ply in this embodiment) containing a number of steel cords 30 therein extending in a radial direction of the tire.

The belt layer 34 comprises at least four belt plies piled radially (four belt plies 35,36,37,38 piled radially in series in this embodiment). A number of steel cords 39,40,41,42 intersect an equatorial plane E of the tire at intersecting angles of 15° to 30° and are embedded in belt plies 35,36,37,38. Further, among plies 35,36,37,38, the belt ply 38 arranged radially outermost has the maximum width. Therefore, it is called a large belt ply 38. It has steel cords 42 as illustrated in FIG. 2 extending from upper left to lower right for instance.

A belt ply 36 arranged radially inward of the large belt ply 38 and has the second width (therefore, it is called a middle belt ply). Ply 36 contains steel cords 40 therein which are oblique in the same directions as the steel cords 42 of the large belt ply 38 (upper left to lower right as illustrated in FIG. 2).

A belt ply 37 arranged radially between the large belt ply 38 and the middle belt ply 36 (therefore, it is called a first small belt ply) has a width smaller than the middle belt ply 36. cords 41 therein which are oblique in opposite directions to, and which intersect, the steel cords 42,40 of the large belt ply 38 and the middle belt ply 36 (upper right to lower left as illustrated in FIG. 2). An innermost belt ply 35 radially inward of the middle belt ply 36 has a width smaller than the middle belt ply 36 (therefore, it is called a second small belt ply). Steel cords 39, all oblique in opposite directions to, and intersect, the steel cords 42,40 of the large belt ply 38 the same as the steel cords 41 of the first small belt ply 37 (upper right to lower left).

Though the first small belt ply 37 is wider than the second small belt ply 35 in the width direction in this embodiment, either of the two plies may be wider than the other in the width direction. Further, the tread 45 made of rubber having a number of grooves 44 is arranged radially outward of the belt layer 34.

When the tire 21 is fitted to large construction vehicles and is running, shearing strains occur in the rubber embraced between the belt ply 35 and 36, the belt ply 36 and 37, and the belt ply 37 and 38 because of deformations of the angles of the steel cords 39,40,41,42 in opposite directions (Pantograph displacement) of belt plies 35,36,37,38 forced by deformations of the tread 45. The shearing strains progressively increase the farther the displaced portions are located from the equatorial plane E of the tire and have the maximum value at both ends of the first small belt ply 37. In this embodiment, the first small belt ply 37, having a width smaller than that of the large belt ply 38 and the middle belt ply 36 is arranged adjacent the large belt ply 38 instead of arranging the middle belt ply 36 having the second width. The value of the shearing strains, therefore, decreases by shortening the overlapping length of the large belt ply 38 and the first small belt ply 37. Further, because the middle belt ply 36 has the steel cords 40 oblique in the same directions as the steel cords 42 of the large belt ply 38, the shearing strains hardly occur in the rubber embraced between these two plies. As a result, the separations never occur at either end of the middle belt ply 36.

The rubber embraced between the large belt ply 38 and the first small belt ply 37 does not easily deform because of its high rigidity caused by the shearing strains. The tread 45 corresponding to an overlapping area of the large belt ply 38 and the first small belt ply 37 inside of the both ends of the first small belt ply 37 in the width directions) is pressed, and the rubber pressed in the tread 45 flows outwardly in the width directions. The rubber flow to both ends of the large belt ply 38 outside of the first small belt ply 37 in the width directions generates tensile forces at both ends of the large belt ply 38. When the rubber flows to both ends of the large belt ply 38, it affects the large belt ply 38 and extends both ends of the large belt ply 38 outwardly in width directions. At this time, the first small belt ply 37 has a smaller width than that of the middle belt ply 36 so that a large length L (Length to be extended), compared with conventional tires, from both ends of the first small belt ply 37 to that of the large belt ply 38 in the width direction can be provided. As a result, the value of the tensile forces generated at both ends of the large belt ply 38 is decreased. This effectively prevents generation of cracks and also belt end separation. Further, a part of the large belt ply 38, radially overlapped with the first small belt ply 37, is restrained so strongly by the rubber embraced between the two plies having high rigidity that it can hardly extend by the rubber flow in the width directions. Also, since the large belt ply 38 having the maximum width is arranged as the outermost ply, it is not necessary to consider the rubber flow of the tread 45 adjacent to the middle belt ply 36, the first small belt ply 37 and the second small belt ply 35, all of which are arranged radially inward of the large belt ply 38.

Figure 3:
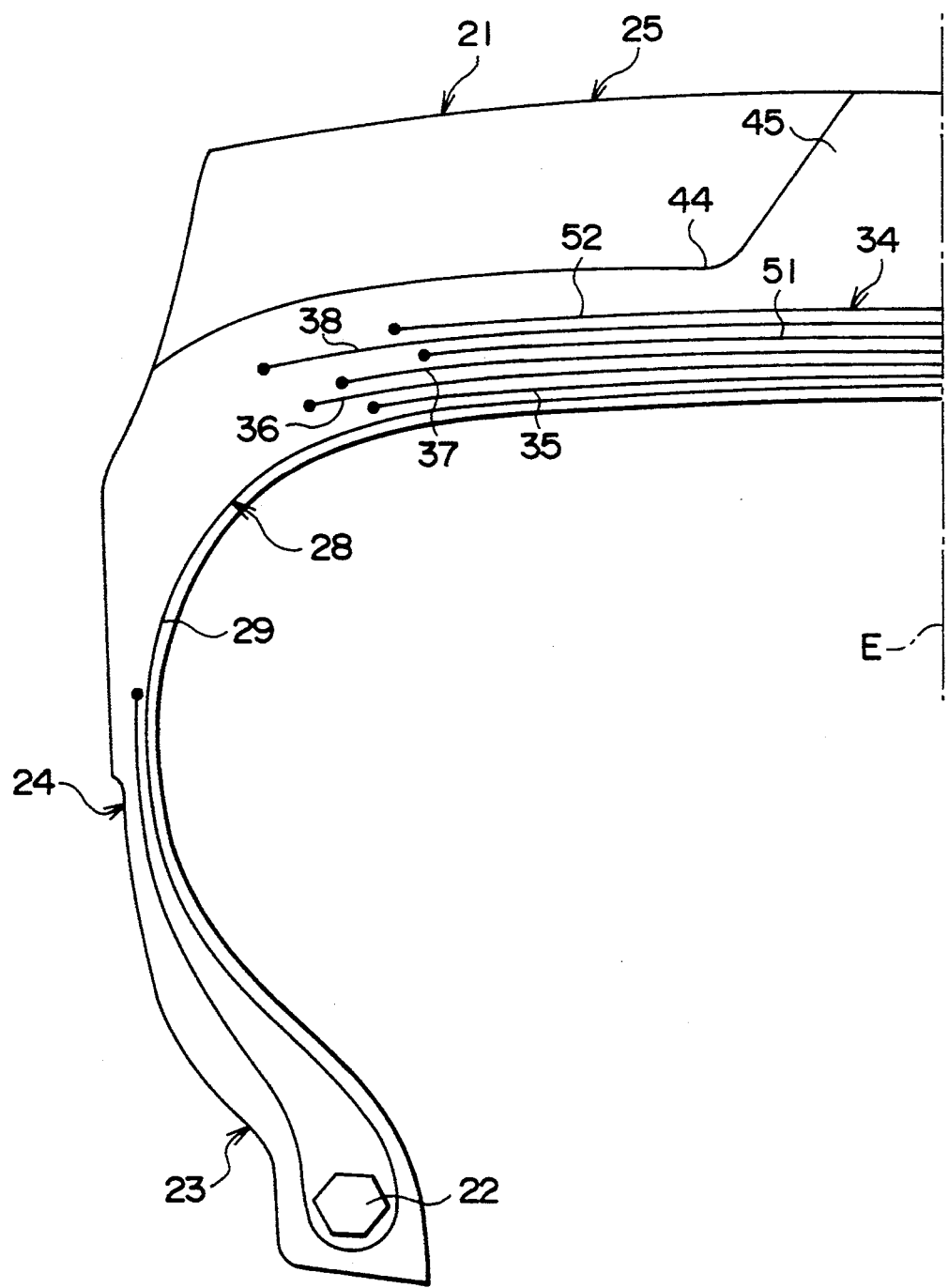
FIG. 3 is a sectional view of a tire of a second embodiment of the invention, taken along an equatorial plane of the tire.

FIG. 3 shows a second embodiment of this invention. In this embodiment, one or more additional belt plies, that is, the first additional belt ply 51, between the large belt ply 38 and the first small belt ply 37, and the second additional belt ply 52 radially outward of the large belt ply 38 are arranged so that the hoop effect of the belt layer 34 can be largely obtained. Steel cords embraced in the first additional belt ply 51 are oblique in the same directions as the steel cords 42 (for example upper left to the lower right) while the steel cords embedded in the second additional belt ply 52 are oblique in opposite directions to the steel cords 42 of the large belt ply 38 (for example upper right to lower left). These additional belt plies may be arranged wherever they are radially outward of the large belt ply 38, radially inward of the second small belt ply 35 and between two plies adjacent each other. The steel cords may be oblique in either directions. The width of the additional belt ply must be smaller than that of the smallest ply among four plies in order to prevent belt end separation. It is smaller than the width of the second small belt ply 35 in this embodiment.

Figure 4:
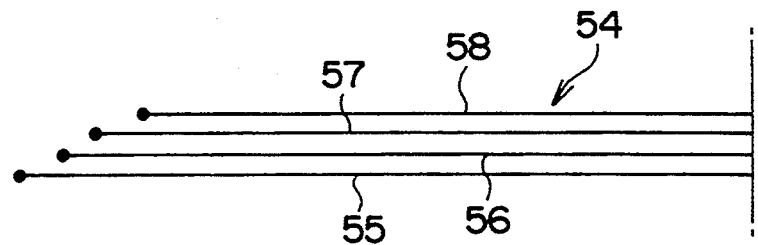
FIG. 4 is a sectional view of the comparison tire 1 used in the experiment taken along an equatorial plane of the tire.
Figure 5:
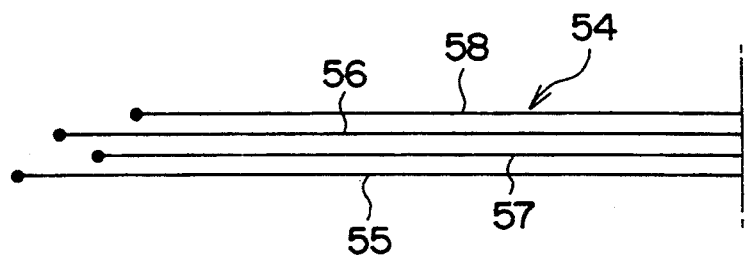
FIG. 5 is a sectional view of the comparison tire 2 used in the experiment taken along an equatorial plane of the tire.
Figure 6:
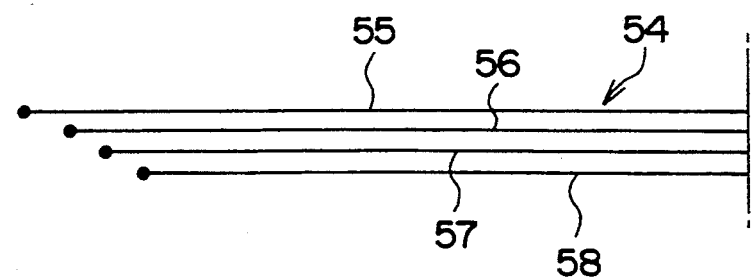
FIG. 6 is a sectional view of the comparison tire 3 used in the experiment taken along an equatorial plane of the tire.
Figure 7:
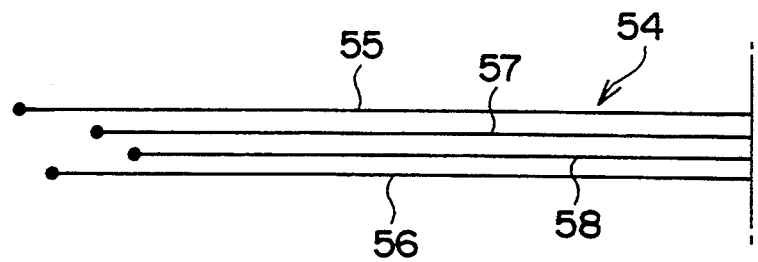
FIG. 7 is a sectional view of the comparison tire 4 used in the experiment taken along an equatorial plane of the tire.
Figure 8:
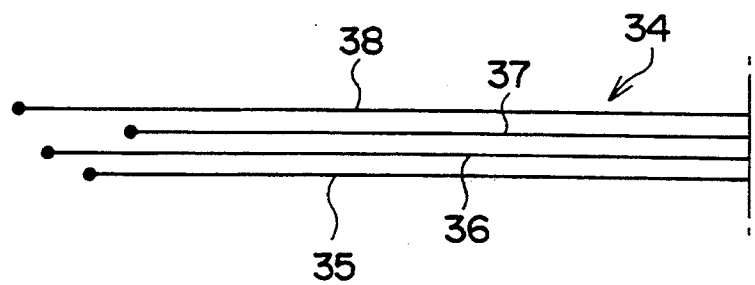
FIG. 8 is a sectional view of the sample tire 2 used in the experiment taken along an equatorial plane of the tire.
Figure 11:
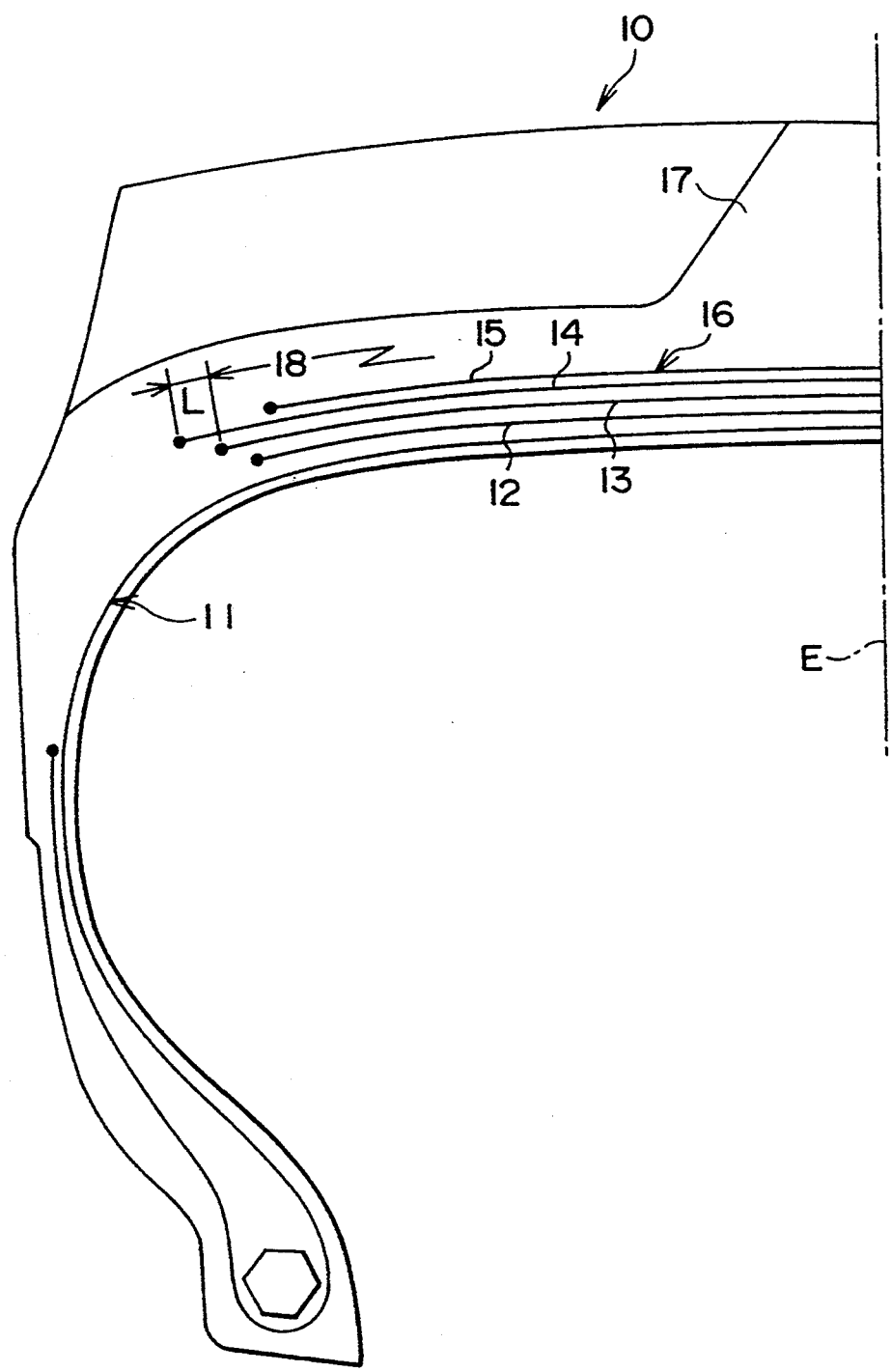
FIG. 11 is a sectional view of the conventional tire used in the experiment taken along an equatorial plane of the tire.

Results of experiments will be explained hereinafter. In these experiments, seven tires were prepared as follows. A conventional tire having a belt layer 16 as shown in FIG. 11. A first comparison tire having a belt layer 54 consisting of a large belt ply 55, a middle belt ply 56, a small belt ply 57, and a belt ply 58 having the smallest width piled in series from radially inward to outward is shown in FIG. 4. A second comparison tire having a belt layer 54 consisting of a large belt ply 55, a small belt ply 57, a middle belt ply 56 and a belt ply 58 the having the smallest width piled in series from radially inward to outward is shown in FIG. 5. A third comparison tire having a belt layer 54 consisting of a belt ply 58 having the smallest width, a small belt ply 57, a middle belt ply 56 and a large belt ply 55 piled in series from radially inward to outward is shown in FIG. 6. A fourth comparison tire having a belt layer 54 consisting of a middle belt ply 56, a belt ply 58 having the smallest width, a small belt ply 57 and a large belt ply 55 piled in series from radially inward to outward is shown in FIG. 7. A first sample tire according to the first embodiment and a second sample tire having a belt layer 34 consisting of a second small belt ply 37, a middle belt ply 36, a first small belt ply 35 wider than the second small belt ply 37 and a large belt ply 38 piled in series from radially inward to outward is shown in FIG. 8. The size of these tires was ORR 1800R25.

The width of the largest belt plies 38, 55 was 350 mm. The width of the middle belt ply 36, 56 was 310 mm. The width of the first small belt ply 37 in the sample tire 1, the second small belt ply 35 and the small belt ply 57 in the sample tire 2 was 270 mm. The width of the second small belt ply 35 in the first sample tire, the first small belt ply 37 in the second sample tire and the belt ply 58 having the smallest width was 230 mm. Intersection angles of steel cords of each ply with an equatorial plane were 23° from upper left to lower right from radially inward to outward. The tires were rolled on a drum whose diameter was 5 m for maximum 500 hours at a speed of 15 km. At this time, the inner pressure of the tires was the standard pressure 7.0 kg/cm$^2$, and the load was 11000 kg which is 120% of the normal load.

In the conventional tire, after running for 300 hours, separations between the belt ply 13 and 14 at both ends of two plies in the width direction caused by Pantograph displacement and large cracks at both end of the belt ply 13 caused by shearing strains were generated. In the first comparison tire, after running for 250 hours, separations between the large belt ply 55 and the middle belt ply 56 caused by Pantograph displacement and large cracks at both ends of all belt plies 55,56,57,58 in width directions caused by shearing strains were generated. In the second comparison tire, after running for 350 hours, large cracks at both ends of the middle belt ply 56 and the belt ply 58 having the smallest width in width directions were generated. In the third comparison tire, after running for 280 hours, separation between the large belt ply 55 and the middle belt ply 56 and small cracks at both ends of the large belt ply 55 caused by shearing strains were generated. In the fourth comparison tire, after running for 320 hours, separations between the large belt ply 55 and both the small belt ply 57 and the middle belt ply 56 caused by Pantograph displacement and small cracks at both ends of the large belt ply 55 caused by shearing strains were generated. In the first and second sample tires according to the invention, however, no separations caused by Pantograph displacement and no cracks caused by shearing strains were generated after running completely under the conditions mentioned above.

Figure 9:
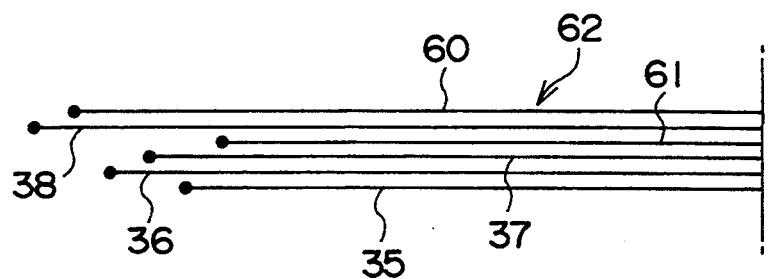
FIG. 9 is a sectional view of the comparison tire 5 used in the experiment taken along an equatorial plane of the tire.
Figure 10:
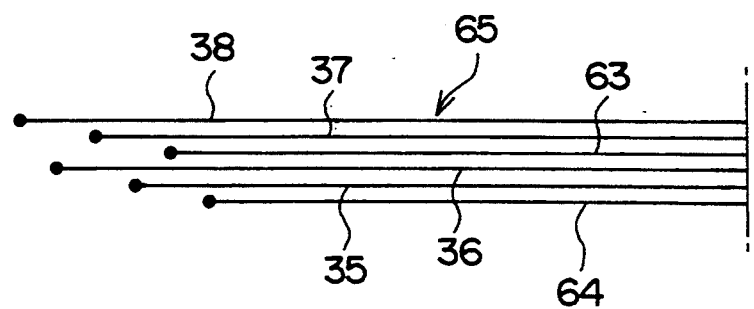
FIG. 10 is a sectional view of the sample tire used in the experiment taken along an equatorial plane of the tire.

In the second experiment, three tires were prepared: Comparison tire 5 comprising a belt layer 62 having an outer additional belt ply 60 (steel cords oblique at an angle of 23° in opposite directions with those of a large belt ply 38) arranged radially outward of the large belt ply 38 having a width smaller than that of the large belt ply 38 and wider than that of a middle belt ply 36 and a mid additional belt ply 61 (steel cords oblique at an angle of 20° in the same directions as those of the large belt ply 38) arranged between the large belt ply 38 and a first small belt ply 37 having the smallest width in addition to the large belt ply 38, the middle belt ply 36, the first small belt ply 37 and a second small belt ply 35 is shown in FIG. 9. A third sample tire according to the second embodiment and a fourth sample tire, comprising a belt layer 65 having a mid additional belt ply 63 (narrower than a first and a second small belt ply 37, 35 and steel cords oblique at an angle of 20° in opposite directions to those of a middle belt ply 36) arranged between the first small belt ply 37 and the middle belt ply 36 and an inner additional belt ply 64 steel cords oblique at an angle of 23° in the same directions as those of the large belt ply 38) arranged radially inward of the second small belt ply 35 having the smallest width in addition to the first small belt ply 37, the middle belt ply 36, the second small belt ply 35 and the large belt ply 38 (the second small belt ply 35 is narrower than the first small belt ply 37) are shown in FIG. 10. The size of the tires was ORR 45/65 R45. Widths of the second small belt ply 35, the first small belt ply 37, the middle belt ply 36 and the large belt ply 38 were 700 mm, 750 mm, 800 mm, 900 mm. Directions and angles of the steel cords were the same as those of the first embodiment. The width of the outer additional belt ply 60, the mid additional belt ply 61, the mid additional belt ply 63 and the inner additional belt ply 64 were 850 mm, 650 mm, 650 mm, 600 mm. The tires were rolled on a drum whose diameter was 5 m for maximum 800 hours at a speed of 5 km. At this time, inner pressure of the tires was the standard pressure 5.25 kg/cm$^2$, and load was 48000 kg which is 120% of the normal load.

In the fifth comparison tire, after running for 600 hours, separations between both ends of the outer additional belt ply 60 and the large belt ply 38 in width directions caused by Pantograph displacement and small cracks caused by shearing strains at both ends of the outer additional belt ply 60 and the large belt ply in width directions 38 were generated. In the third and fourth sample tires according to the invention, however, no separations caused by Pantograph displacement and no cracks caused by shearing strains were generated after running completely under the conditions mentioned above.

As can be seen from the above explanation, the separations at both ends of the belt plies are effectively prevented according to the invention.

It is further understood by those skilled in the art that the foregoing description is that of preferred embodiments of the disclosed tires and that various changes and modifications may be made in the invention without departing from the spirit and scope thereof.

What is claimed is:

1. A heavy duty pneumatic radial tire comprising a carcass layer containing steel cords therein extending in a radial direction of the tire, a belt layer comprising; four belt plies piled radially one above another containing steel cords therein, a tread arranged radially outward of the belt layer, wherein the four belt plies include a large belt ply having a width wider than that of any other belt plies, a middle belt ply arranged radially inward of the large belt ply having steel cords oblique in the same directions as those of steel cords of the large belt ply, a first small belt ply arranged between the large belt ply and the middle belt ply and having steel cords oblique in opposite directions to those of the cords of the large belt ply and a width smaller than that of the middle ply, a second small belt ply arranged radially inward of the middle belt ply and having steel cords oblique in opposite directions to those of the cords of the large belt ply and a width smaller than that of the middle belt ply, further comprising at least two additional belt plies, each of said additional belt plies having a width smaller than that of the ply which has the smallest Width among said four belt plies, and at least one of said four belt plies being arranged radially between any two of said additional belt plies.

2. The heavy duty pneumatic radial tire of claim 1, wherein said first small ply has a width greater than that of said second small ply.

3. The heavy duty pneumatic radial tire of claim 1, wherein said large belt ply is interposed between two of said additional belt plies.

4. The heavy duty pneumatic radial tire according to claim 1, wherein the cord of said four belt plies intersect an equatorial plane of said tire at angles in the range of 15–30 degrees.

5. The heavy duty pneumatic radial tire according to claim 4, wherein said cord angles are the same for each belt ply.

* * * * *